United States Patent
Kubotani

(10) Patent No.: US 12,221,032 B2
(45) Date of Patent: Feb. 11, 2025

(54) ENGINE-TYPE INDUSTRIAL VEHICLE

(71) Applicant: KABUSHIKI KAISHA TOYOTA JIDOSHOKKI, Kariya (JP)

(72) Inventor: Takehiro Kubotani, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/533,744

(22) Filed: Nov. 23, 2021

(65) Prior Publication Data

US 2022/0185171 A1 Jun. 16, 2022

(30) Foreign Application Priority Data

Dec. 14, 2020 (JP) ................. 2020-207054

(51) Int. Cl.
*B60Q 1/26* (2006.01)
*B60Q 5/00* (2006.01)
*G05D 1/00* (2024.01)

(52) U.S. Cl.
CPC ............... *B60Q 1/26* (2013.01); *B60Q 5/006* (2013.01); *G05D 1/0055* (2013.01);
(Continued)

(58) Field of Classification Search
CPC .. G05D 1/0088; G05D 1/0242; G05D 1/0246; G05D 1/0255; G05D 1/0278;
(Continued)

(56) References Cited

U.S. PATENT DOCUMENTS 6,480,769 B1 11/2002 Kageyama
7,524,268 B2 * 4/2009 Oka ..................... B66F 17/003
477/169
(Continued)

FOREIGN PATENT DOCUMENTS

DE 102010028911 A1 11/2011
JP 2001-109519 A 4/2001
(Continued)

OTHER PUBLICATIONS

Extended European Search Report dated May 11, 2022 from the European Patent Office in EP Application No. 21210436.8.

*Primary Examiner* — Marc Burgess
*Assistant Examiner* — John D Holman
(74) *Attorney, Agent, or Firm* — Sughrue Mion, PLLC

(57) ABSTRACT

An engine-type industrial vehicle includes a power transmission; a main controller; an object detector configured to detect a position of an object; a predicted trajectory calculator configured to derive a predicted trajectory followed by a vehicle body; and a vehicle-speed upper-limit setter configured to impose a vehicle speed limitation on the vehicle body by setting a vehicle-speed upper-limit value when the detected object is positioned on the predicted trajectory and a traveling direction of the vehicle body is a direction toward the object. The main controller is configured to prevent a vehicle speed of the vehicle body from exceeding the vehicle-speed upper-limit value by performing at least one of a control so that a force acts in a direction in which movement of the vehicle body is prevented or a control so that a driving force to the driving wheel is cut off.

4 Claims, 6 Drawing Sheets

(52) U.S. Cl.
CPC ......... *G05D 1/0088* (2013.01); *G05D 1/0242* (2013.01); *G05D 1/0246* (2013.01); *G05D 1/0255* (2013.01); *G05D 1/0278* (2013.01); *G05D 1/028* (2013.01)

(58) Field of Classification Search
CPC ................ G05D 1/028; G05D 1/0055; G05D 2201/0201; B60Q 1/26
USPC .......................................................... 701/41
See application file for complete search history.

(56) References Cited

U.S. PATENT DOCUMENTS

| | | | |
|---|---|---|---|
| 7,568,547 B2* | 8/2009 | Yamada | B66F 9/07572 |
| | | | 180/282 |
| 2014/0005869 A1* | 1/2014 | Kubotani | B60W 30/146 |
| | | | 701/22 |
| 2017/0135277 A1 | 5/2017 | Hiramatsu et al. | |
| 2017/0274904 A1* | 9/2017 | Koide | F02D 31/001 |
| 2018/0057049 A1* | 3/2018 | Stewart | B66F 9/063 |
| 2018/0162383 A1* | 6/2018 | Kubotani | B60W 30/04 |
| 2018/0162705 A1* | 6/2018 | Kubotani | B60G 17/0162 |
| 2019/0136966 A1* | 5/2019 | Koide | B60W 10/023 |
| 2020/0111229 A1* | 4/2020 | Ishizaki | G06T 7/73 |
| 2021/0340805 A1* | 11/2021 | Lammering | B60T 7/18 |

FOREIGN PATENT DOCUMENTS

| | | |
|---|---|---|
| JP | 2013-159117 A | 8/2013 |
| WO | 2015/147149 A1 | 10/2015 |

\* cited by examiner

| CONTROL | STATE | VEHICLE SPEED UPPER LIMIT | ACCELERATION UPPER LIMIT |
|---|---|---|---|
| TRAVEL STOP CONTROL | NORMAL CONTROL | NO LIMIT | NO LIMIT |
| | TRAVEL LIMITATION | 0 | NO LIMIT |
| | TRAVEL LIMITATION PRE-REMOVAL | NO LIMIT | $AS1$ |
| VEHICLE SPEED LIMITATION CONTROL | LIMITATION REMOVAL | NO LIMIT | NO LIMIT |
| | LIMITATION START | MAP VALUE | NO LIMIT |
| | LIMITATION PRE-REMOVAL | NO LIMIT | $AS2$ |

ENGINE-TYPE INDUSTRIAL VEHICLE

CROSS-REFERENCE TO RELATED APPLICATION

This application claims priority to Japanese Patent Application No. 2020-207054 filed on Dec. 14, 2020, the entire disclosure of which is incorporated herein by reference.

The present disclosure relates to an engine-type industrial vehicle.

BACKGROUND OF THE INVENTION

An engine-type industrial vehicle disclosed in International Publication No. 2015/147149 includes a sensor that detects an object, a controller, and an engine. The engine-type industrial vehicle travels by the driving force of the engine. The controller performs control so that the engine-type industrial vehicle stops, when the sensor detects that an object exists within a setting range. The setting range is the longest distance that the engine-type industrial vehicle travels until the engine-type industrial vehicle stops.

In the engine-type industrial vehicle disclosed in International Publication No. 2015/147149, when an object exists within the setting range, the controller performs control so that the engine-type industrial vehicle stops. It is desired that the engine-type industrial vehicle avoids contact with the object in a more suitable manner.

SUMMARY

In accordance with an aspect of the present invention, there is provided an engine-type industrial vehicle that includes a vehicle body; an engine; a power transmission configured to transmit a driving force of the engine to a driving wheel; a main controller configured to adjust the driving force to be transmitted to the driving wheel; an object detector configured to detect a position of an object that exists in a traveling direction of the vehicle body; a predicted trajectory calculator configured to derive a predicted trajectory that is a trajectory predicted to be followed by the vehicle body; and a vehicle-speed upper-limit setter configured to impose a vehicle speed limitation on the vehicle body by setting a vehicle-speed upper-limit value when the object detected by the object detector is positioned on the predicted trajectory and a traveling direction of the vehicle body is a direction toward the object. The main controller is configured to prevent a vehicle speed of the vehicle body from exceeding the vehicle-speed upper-limit value by performing at least one of a control so that a force acts in a direction in which movement of the vehicle body is prevented or a control so that the driving force to the driving wheel is cut off.

Other aspects and advantages of the invention will become apparent from the following description, taken in conjunction with the accompanying drawings, illustrating by way of example the principles of the invention.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

One embodiment of an engine-type industrial vehicle will be described below.

Figure 1:
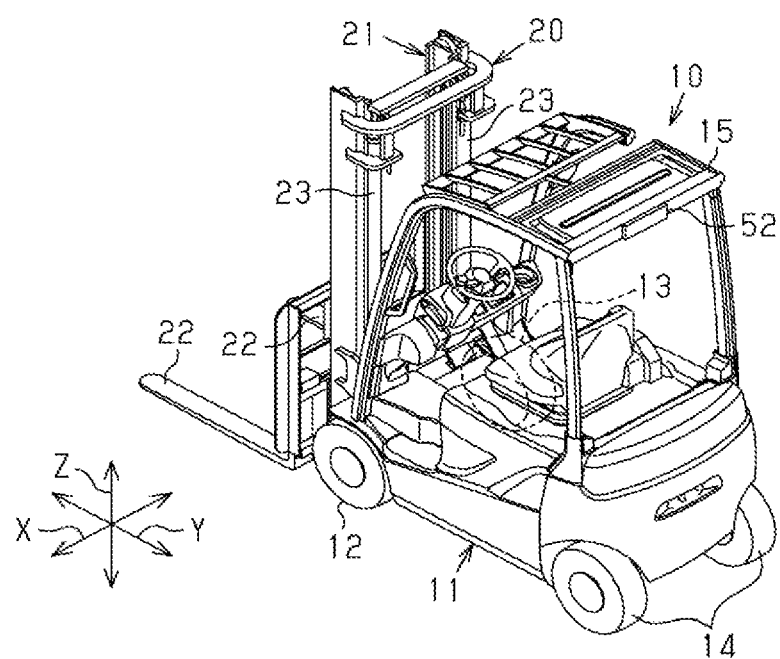
FIG. 1 is a perspective view of a forklift.

As illustrated in FIG. 1, a forklift 10 serving as the engine-type industrial vehicle includes a vehicle body 11, two driving wheels 12 and 13, two steered wheels 14, and a load handling apparatus 20.

The vehicle body 11 includes a head guard 15 provided above a driver's seat. In the description below, terms of "front", "back/rear", "left", and "right" indicate the front, back/rear, left, and right of the forklift 10.

The driving wheels 12 and 13 are disposed in a lower front portion of the vehicle body 11. The two driving wheels 12 and 13 are spaced apart from each other in the vehicle width direction.

The two steered wheels 14 are disposed in a lower rear portion of the vehicle body 11. The two steered wheels 14 are spaced apart from each other in the vehicle width direction.

The load handling apparatus 20 includes a mast 21, a pair of forks 22, and lift cylinders 23. The mast 21 is provided on a front portion of the vehicle body 11. The forks 22 are liftable and lowerable together with the mast 21. A load is loaded on the forks 22. The lift cylinders 23 are hydraulic cylinders. The mast 21 is lifted and lowered by the extension and contraction of the lift cylinders 23. The forks 22 are lifted and lowered with the lifting and lowering of the mast 21. In this embodiment, the traveling motion and the load handling motion of the forklift 10 are performed in response to operations by an operator.

Figure 2:
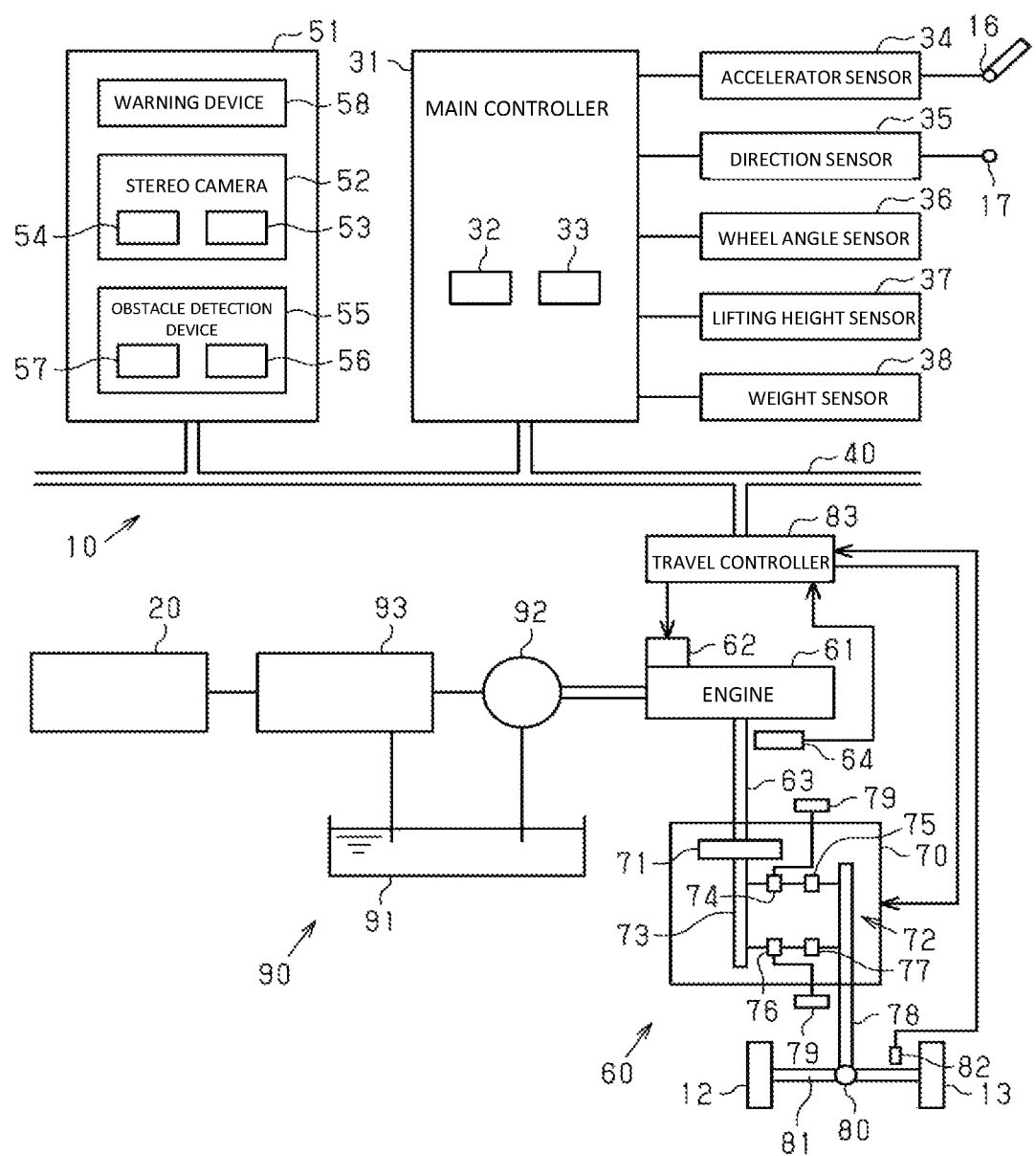
FIG. 2 is a schematic configuration diagram of the forklift.

As illustrated in FIG. 2, the forklift 10 includes a main controller 31, an accelerator pedal 16, an accelerator sensor 34, a direction lever 17, a direction sensor 35, a wheel angle sensor 36, a lifting height sensor 37, a weight sensor 38, a traveling system 60, a load handling system 90, an object detector 51, and a bus 40.

The main controller 31 includes a processor 32 and a storage unit 33. As the processor 32, for example, a central processing unit (CPU), a graphics processing unit (GPU), or a digital signal processor (DSP) is used. The storage unit 33 includes a random access memory (RAM) and a read only memory (ROM). The storage unit 33 stores a program used to operate the forklift 10. Specifically, the storage unit 33 stores program codes or commands so as to cause the processor 32 to execute processing. The storage unit 33, i.e., a computer readable medium, includes any available media accessible by a general-purpose or dedicated computer. The main controller 31 may include hardware circuits, such as an application specific integrated circuit (ASIC) and a field programmable gate array (FPGA). The main controller 31, which is a processing circuit, may include one or more processors that operate in accordance with a computer program, one or more hardware circuits, such as the ASIC and the FPGA, or a combination thereof.

The accelerator sensor 34 detects the operation amount of the accelerator pedal 16. In other words, the operation amount of the accelerator pedal 16 is an accelerator opening degree (i.e., a position of the accelerator). The accelerator sensor 34 outputs an electrical signal according to the accelerator opening degree to the main controller 31. The main controller 31 recognizes the accelerator opening degree by the electrical signal from the accelerator sensor 34.

The direction sensor 35 detects the operation direction of the direction lever 17. The direction lever 17 is operated by the operator to give an instruction on the traveling direction of the vehicle body 11. In other words, the traveling direction of the vehicle body 11 is the traveling direction of the forklift 10. The direction sensor 35 detects whether the operation direction of the direction lever 17 has instructed the forklift 10 to move forward or move backward, with reference to neutral as the standard. The direction sensor 35 outputs an electrical signal according to the operation direction of the direction lever 17 to the main controller 31. The main controller 31 recognizes the operation direction of the direction lever 17 by the electrical signal from the direction sensor 35. Accordingly, the main controller 31 grasps whether the operator has instructed the forklift 10 to move forward, move backward, or neither.

The wheel angle sensor 36 detects the steering angles of the steered wheels 14. The wheel angle sensor 36 outputs an electrical signal according to the steering angles to the main controller 31. The main controller 31 recognizes the steering angles by the electrical signal from the wheel angle sensor 36.

The lifting height sensor 37 detects the lifting height of the load handling apparatus 20. The lifting height of the load handling apparatus 20 is the height from a road surface to the forks 22. The lifting height sensor 37 is a reel sensor, for example. The lifting height sensor 37 outputs an electrical signal according to the lifting height to the main controller 31. The main controller 31 recognizes the lifting height of the load handling apparatus 20 by the electrical signal from the lifting height sensor 37.

The weight sensor 38 detects the weight of the load loaded on the load handling apparatus 20. The weight sensor 38 is a pressure sensor that detects the oil pressure of the lift cylinders 23, for example. The weight sensor 38 outputs an electrical signal according to the weight of the load to the main controller 31. The main controller 31 recognizes the weight of the load by the electrical signal from the weight sensor 38.

The traveling system 60 is a mechanism configured to move the vehicle body 11. The traveling system 60 includes an engine 61, an output shaft 63, a rotational speed sensor 64, a power transmission 70, a differential apparatus 80, an axle 81, a vehicle speed sensor 82, and a travel controller 83.

The engine 61 is a driving source of the traveling motion and the load handling motion of the forklift 10. The engine 61 of this embodiment is a gasoline-fueled engine. The engine 61 includes a throttle actuator 62. The throttle actuator 62 adjusts the throttle opening degree. The adjustment of the throttle opening degree by the throttle actuator 62 adjusts the amount of air supplied to the engine 61. As a result, the rotational speed of the engine 61 is controlled.

The output shaft 63 is coupled to the engine 61. The output shaft 63 is rotated by the driving of the engine 61.

The rotational speed sensor 64 is provided on the output shaft 63. The rotational speed sensor 64 detects the rotational speed of the engine 61. The rotational speed of the engine 61 is the rotational speed of the output shaft 63. The rotational speed sensor 64 outputs an electrical signal according to the rotational speed of the output shaft 63 to the travel controller 83.

The power transmission 70 transmits the driving force of the engine 61 to the driving wheels 12 and 13. The power transmission 70 includes a torque converter 71, a transmission 72, and solenoid valves 79.

The torque converter 71 is coupled to the output shaft 63. The driving force of the engine 61 is transmitted to the torque converter 71 via the output shaft 63. The torque converter 71 includes a pump and a turbine coupled to the output shaft 63. In the torque converter 71, the turbine is rotated by hydraulic oil discharged from the pump.

The transmission 72 includes an input shaft 73, a forward clutch 74, a forward gear train 75, a reverse clutch 76, a reverse gear train 77, and an output shaft 78.

The input shaft 73 is coupled to the torque converter 71. The driving force is transmitted to the transmission 72 from the torque converter 71 via the input shaft 73.

The forward clutch 74 is provided on the input shaft 73. The forward gear train 75 is provided between the forward clutch 74 and the output shaft 78. The forward clutch 74 is switched between a connected state and a cut-off state. The connected state is a state in which the input shaft 73 and the forward gear train 75 are connected to each other. The cut-off state is a state in which the input shaft 73 and the forward gear train 75 are cut off from each other. When the input shaft 73 and the forward gear train 75 are connected to each other by the forward clutch 74, the driving force is transmitted to the forward gear train 75 from the input shaft 73. The driving force transmitted to the forward gear train 75 is transmitted to the output shaft 78. In other words, the driving force of the engine 61 is transmitted to the output shaft 78 when the forward clutch 74 is connected to the forward gear train 75. When the forward clutch 74 and the forward gear train 75 are cut off from each other, the driving force is not transmitted to the forward gear train 75 from the input shaft 73.

The reverse clutch 76 is provided on the input shaft 73. The reverse gear train 77 is provided between the reverse clutch 76 and the output shaft 78. The reverse clutch 76 is switched between a connected state and a cut-off state. The connected state is a state in which the input shaft 73 and the reverse gear train 77 are connected to each other. The cut-off state is a state in which the input shaft 73 and the reverse gear train 77 are cut off from each other. When the input shaft 73 and the reverse gear train 77 are connected to each other by the reverse clutch 76, the driving force is transmitted to the reverse gear train 77 from the input shaft 73. The driving force transmitted to the reverse gear train 77 is transmitted to the output shaft 78. In other words, the driving force of the engine 61 is transmitted to the output shaft 78 when the reverse clutch 76 is connected to the reverse gear train 77. When the reverse clutch 76 and the reverse gear train 77 are cut off from each other, the driving force is not transmitted to the reverse gear train 77 from the input shaft 73.

As the forward clutch 74 and the reverse clutch 76, a hydraulic clutch is used. Examples of the hydraulic clutch include a multiplate wet clutch.

The driving force is transmitted to the output shaft 78 when the forward clutch 74 or the reverse clutch 76 is in the connected state. The output shaft 78 is rotated by the driving force transmitted from the forward clutch 74 or the reverse clutch 76.

One solenoid valve 79 is provided for each of the forward clutch 74 and the reverse clutch 76. The solenoid valves 79 control the supply and discharge of the hydraulic oil to and from the forward clutch 74 and the reverse clutch 76. Each solenoid valve 79 performs the supply and discharge of the hydraulic oil in accordance with the power distribution to a solenoid. The clutches 74 and 76 are switched between the connected state and the cut-off state by the supply and discharge of the hydraulic oil controlled by the solenoid valve 79.

The forward clutch 74 and the forward gear train 75 are connected to each other according to the instruction of the direction lever 17 for forward movement. The reverse clutch 76 and the reverse gear train 77 are connected to each other according to the instruction of the direction lever 17 for backward movement. Both of the forward clutch 74 and the reverse clutch 76 are placed in the cut-off state according to the instruction of the direction lever 17 for placing the forklift 10 in the neutral state.

The differential apparatus 80 is coupled to the output shaft 78. The axle 81 is coupled to the differential apparatus 80. The driving wheels 12 and 13 are coupled to the axle 81. When the output shaft 78 rotates, the axle 81 rotates. The driving wheels 12 and 13 are rotated by the rotation of the axle 81, so that the forklift 10 travels. When the forward clutch 74 and the forward gear train 75 are connected to each other, the forklift 10 moves forward. When the reverse clutch 76 and the reverse gear train 77 are connected to each other, the forklift 10 moves backward.

The vehicle speed sensor 82 is a sensor for detecting the vehicle speed of the vehicle body 11. The vehicle speed of the vehicle body 11 means the vehicle speed of the forklift 10. The vehicle speed sensor 82 is provided on the output shaft 78 or the axle 81, for example. The vehicle speed sensor 82 outputs a pulse signal according to the vehicle speed of the vehicle body 11 to the travel controller 83.

The travel controller 83 is an engine control unit that controls the engine 61. The hardware configuration of the travel controller 83 is similar to that of the main controller 31, for example. The travel controller 83 adjusts the throttle opening degree by controlling the throttle actuator 62. The adjustment of the throttle opening degree adjusts the driving force of the engine 61. The travel controller 83 controls the solenoid valves 79 that respectively switch the states of the clutches 74 and 76 between the connected state and the cut-off state. As a result, the clutches 74 and 76 are switched between the connected state and the cut-off state.

The load handling system 90 is a mechanism configured to operate the load handling apparatus 20. The load handling system 90 includes an oil tank 91 in which hydraulic oil is stored, a hydraulic pump 92, and a hydraulic mechanism 93.

The hydraulic pump 92 is driven by the engine 61. The hydraulic pump 92 pumps up the hydraulic oil from the oil tank 91. The hydraulic oil pumped up is supplied to the hydraulic mechanism 93.

The hydraulic mechanism 93 includes a control valve. The control valve controls the supply and discharge of the hydraulic oil to and from hydraulic equipment. Examples of the hydraulic equipment include the lift cylinders 23 and a tilt cylinder that tilts the load handling apparatus 20. The load handling apparatus 20 is operated by the supply or discharge of the hydraulic oil. The hydraulic equipment simply need to be hydraulic equipment included in the forklift 10, and may be hydraulic equipment included in the vehicle body 11. Examples of the hydraulic equipment included in the vehicle body 11 include the clutches 74 and 76.

The object detector 51 includes a stereo camera 52 for picking up images, an obstacle detection device 55 that detects an object from an image picked up by the stereo camera 52, and a warning device 58. As illustrated in FIG. 1, the stereo camera 52 is disposed on the head guard 15. The stereo camera 52 is disposed so as to have a bird's-eye view of the road surface on which the forklift 10 travels from an upper side of the forklift 10. The stereo camera 52 of this embodiment picks up an image of a view behind the forklift 10. Therefore, the object detected by the obstacle detection device 55 is an object located behind the forklift 10. The warning device 58 and the obstacle detection device 55 may be unitized with the stereo camera 52 and may be disposed, with the stereo camera 52, on the head guard 15. The warning device 58 and the obstacle detection device 55 may be disposed in positions different from the position of the head guard 15.

As illustrated in FIG. 2, the stereo camera 52 includes two cameras 53 and 54. The cameras 53 and 54 are cameras using a CCD image sensor or a CMOS image sensor, for example. Each of the cameras 53 and 54 is disposed such that optical axes thereof are parallel to each other. The two cameras 53 and 54 are spaced apart from each other, and hence the same object shows up in a shifted manner in images picked up by the two cameras 53 and 54. Specifically, when images of the same object are picked up by two cameras 53 and 54, the images show misalignment of pixels for the object depending on the distance between the two cameras 53 and 54. The stereo camera 52 of this embodiment is a wide-angle stereo camera of which horizontal angle of view is 100 degrees or more, but may be a non-wide-angle stereo camera.

The obstacle detection device 55 includes a processor 56 and a storage unit 57. As the processor 56, for example, a CPU, a GPU, or a DSP is used. The storage unit 57 includes a RAM and a ROM. The storage unit 57 stores various programs for detecting an object from the images picked up by the stereo camera 52. Specifically, the storage unit 57 stores program codes or commands to cause the processor 56 to execute processing. The storage unit 57, i.e., a computer readable medium, includes any available media accessible by a general-purpose or dedicated computer. The obstacle detection device 55 may include a hardware circuit, such as an ASIC or an FPGA. The obstacle detection device 55, which is a processing circuit, may include one or more processors that operate in accordance with a computer program, one or more hardware circuits, such as an ASIC and an FPGA, or a combination thereof.

The obstacle detection device 55 repeatedly performs processing below in a designated control cycle to detect an object existing around the forklift 10. The obstacle detection device 55 derives the position of the detected object. The position of the object is a position relative to the forklift 10.

Figure 3:
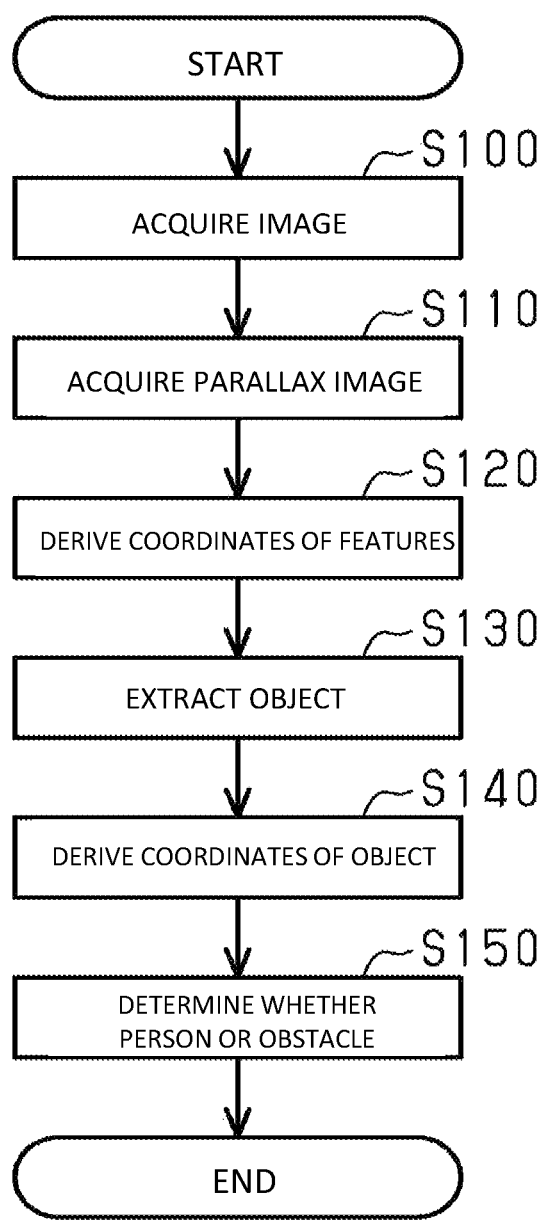
FIG. 3 is a flowchart illustrating processing performed by an obstacle detection device.

As illustrated in FIG. 3, in Step S100, the obstacle detection device 55 acquires an image from each of the cameras 53 and 54 of the stereo camera 52.

Next, in Step S110, the obstacle detection device 55 acquires a parallax image by performing stereo processing. The parallax image is obtained by linking a parallax [px] to the pixels. The parallax image does not necessarily require display, and indicates data in which the parallax is linked to each pixel in the parallax image. The parallax is acquired by comparing the image picked up by the camera 53 of the stereo camera 52 and the image picked up by the camera 54 of the stereo camera 52, and deriving a difference in the number of pixels between the images for the same feature points shown in the images. The obstacle detection device 55 sets one of the images picked up by the two cameras 53 and 54 to be a reference image and the other thereof to be a comparison image, and extracts the most similar pixel of the comparison image for each pixel of the reference image. The obstacle detection device 55 calculates the difference in the number of pixels between the pixels of the reference image and the pixels of the comparison image as the parallax. As a result, the parallax image in which the parallax is linked to each pixel of the reference image is acquired. The feature point is a part of an object that is recognized as a boundary, such as an edge of the object. The feature point is detected from brightness information and the like.

Next, in Step S120, the obstacle detection device 55 derives coordinates of the feature points in a world coordinate system, which is a coordinate system on an actual space. In the world coordinate system, the X-axis extends in one of horizontal directions of a horizontal plane and along the vehicle width direction of the forklift 10, the Y-axis extends in one of the horizontal directions is orthogonal to the X-axis, and the Z-axis extends in a vertical direction, in a state in which the forklift 10 is positioned on the horizontal plane. The obstacle detection device 55 derives coordinates of the feature points in a camera coordinate system from a base line length of the stereo camera 52, a focal length of the stereo camera 52, and the parallax image acquired in Step S110, and then converts the coordinates derived to coordinates in the world coordinate system. As illustrated in FIG. 1, the X-axis, the Y-axis, and the Z-axis are indicated by arrows X, Y, and Z.

As illustrated in FIG. 3, in Step S130, the obstacle detection device 55 extracts the object by clustering the feature points. The feature points express a part of the object. From the feature points, the obstacle detection device 55 find a cluster of feature points assumed to express a part of the same object, and extracts the cluster as the object. More specifically, the obstacle detection device 55 clusters feature points positioned within a predetermined range based on the coordinates of the feature points in the world coordinate system derived in Step S120. The obstacle detection device 55 recognizes the clustered feature points as one object. The clustering of the feature points in Step S130 may be performed by various approaches.

Next, in Step S140, the obstacle detection device 55 derives the coordinates of the object in the world coordinate system. The coordinates of the object are derived from the coordinates of the feature points of the cluster. The coordinates of the object in the world coordinate system express a position of the object relative to the forklift 10. Specifically, out of the coordinates of the object in the world coordinate system, the X-coordinate of the object expresses the distance from the origin to the object in the left-right direction, and the Y-coordinate of the object expresses the distance from the origin to the object in the front-rear direction. For example, the X-coordinate and the Y-coordinate of the coordinate origin corresponds to the position of the stereo camera 52 and the Z-coordinate of the coordinate origin is based on the road surface. The X-coordinate and the Y-coordinate of the object allow derivation of the Euclidean distance from the position of the stereo camera 52 to the object. The Z-coordinate of the object in the world coordinate system expresses the height from the road surface to the object.

Next, in Step S150, the obstacle detection device 55 determines whether the object is a person or an obstacle other than a person. The determination of whether the object is a person is performed by various methods. In this embodiment, the obstacle detection device 55 performs person detection processing using an image picked up by one of the two cameras 53 and 54 of the stereo camera 52. The obstacle detection device 55 converts the coordinates of the object in the world coordinate system acquired in Step S140 to camera coordinates, and further converts the camera coordinates to the coordinates in the image picked up by the camera 53 or the camera 54. In this embodiment, the obstacle detection device 55 converts the coordinates of the object in the world coordinate system to the coordinates in the reference image. The obstacle detection device 55 performs the person detection processing using the coordinates of an object in the reference image. The person detection processing performs feature extraction and use a person determiner that has learned through machine learning in advance, for example. Means of the feature extraction include a means to extract a feature amount of a local area in an image, such as a Histogram of Oriented Gradients (HOG) feature amount or a Haar-Like feature amount. As the person determiner, a person determiner that has learned through supervised machine learning is used, for example. Examples of the supervised learning model include a support vector machine, a neural network, naive Bayes, deep learning, and a decision tree. Training data used in the machine learning includes image-specific components, such as appearance elements and shape elements of a person extracted from an image. Examples of the shape elements include the size and the contour of a person. Examples of the appearance elements include light source information, texture information, and camera information. The light source information includes information relating to reflectance and shade. The texture information includes color information. The camera information includes information relating to image quality, resolution, and angle of view.

The warning device 58 is configured to give a warning to the operator of the forklift 10. Examples of the warning device 58 include a buzzer that gives a warning by sound, a lamp that gives a warning by light, or a combination thereof.

As illustrated in FIG. 2, the main controller 31, the travel controller 83, and the object detector 51 are configured to acquire information from each other by the bus 40. The main controller 31, the travel controller 83, and the object detector 51 acquire information from each other by performing communication in accordance with a communication protocol for a vehicle, such as a controller area network (CAN) or local interconnect network (LIN).

The main controller 31 derives the vehicle speed of the vehicle body 11 by using the detection result of the vehicle speed sensor 82, the gear ratio, the outer diameters of the driving wheels 12 and 13, the steering angles detected by the wheel angle sensor 36, and the like. The detection result of the vehicle speed sensor 82 is acquired from the travel controller 83. The gear ratio and the outer diameters of the driving wheels 12 and 13 simply need to be stored in the storage unit 33 in advance. The main controller 31 also derives the traveling direction of the vehicle body 11 together with the vehicle speed of the vehicle body 11. The traveling direction of the vehicle body 11 is either the forward movement direction or the backward movement direction. In this embodiment, the vehicle speed means an absolute value of the vehicle speed.

The main controller 31 activates the warning device 58 by transmitting a warning command via the bus 40. Specifically, the object detector 51 includes an activator that activates the warning device 58, and the activator activates the warning device 58 upon receiving the warning command.

Next, the control of the vehicle speed performed in the forklift 10 will be described.

In the forklift 10, the main controller 31 performs automatic deceleration control depending on the position and type of the object detected by the object detector 51. There are two types of the object: a person and an obstacle other than a person. In the description below, the obstacle means an object other than a person.

Figure 4:
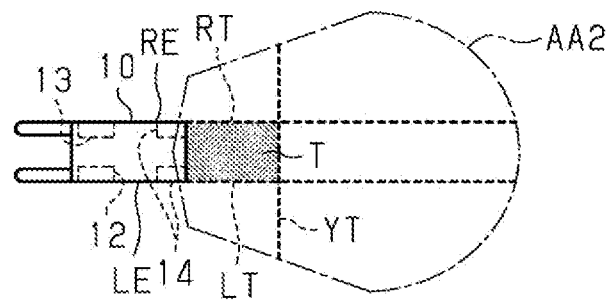
FIG. 4 is a view schematically illustrating an automatic deceleration area and a predicted trajectory.

As illustrated in FIG. 4, an automatic deceleration area AA2 used in the automatic deceleration control is set within a detectable area in which the object detector 51 can detect an object. In other words, the detectable area in which the object detector 51 can detect an object is an area in which the stereo camera 52 can pick up images. In this embodiment, the automatic deceleration area AA2 is the same region as the detectable area in which the object detector 51 can detect an object. The automatic deceleration area AA2 is a region that spreads rearward of the forklift 10 from the position of the stereo camera 52 and along the vehicle width direction of the forklift 10. The automatic deceleration area AA2 is an area defined by the X-coordinate and the Y-coordinate in the world coordinate system.

The main controller 31 derives a predicted trajectory T of the vehicle body 11. The predicted trajectory T is a trajectory that is predicted to be followed by the vehicle body 11. In this embodiment, the main controller 31 derives the predicted trajectory T that is predicted to be followed by the vehicle body 11 when the traveling direction of the vehicle body 11 is the backward movement direction, for example, when the operation direction of the direction lever 17 by the operator has instructed the forklift 10 to move backward. The predicted trajectory T of the vehicle body 11 means the predicted trajectory T of the forklift 10.

The predicted trajectory T is derived from the steering angles of the steered wheels 14 and dimension information of the forklift 10. The dimension information of the forklift 10 includes the dimension [mm] from the central axis line of the driving wheels 12 and 13 to a rear end of the vehicle body 11, the wheelbase [mm], and the vehicle width [mm]. The dimension information of the forklift 10 is known information, and hence is stored in the storage unit 33 of the main controller 31 and the like in advance. The predicted trajectory T is a region between a trajectory LT followed by a left end LE of the vehicle body 11 and a trajectory RT followed by a right end RE of the vehicle body 11. The main controller 31 derives the X-coordinate and the Y-coordinate of the predicted trajectory T that extends rearward of the forklift 10 in the world coordinate system.

Figure 5:
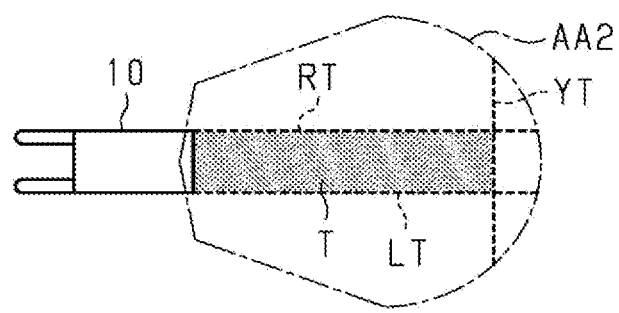
FIG. 5 is a view schematically illustrating a predicted trajectory when the vehicle speed of the forklift is increased.
Figure 6:
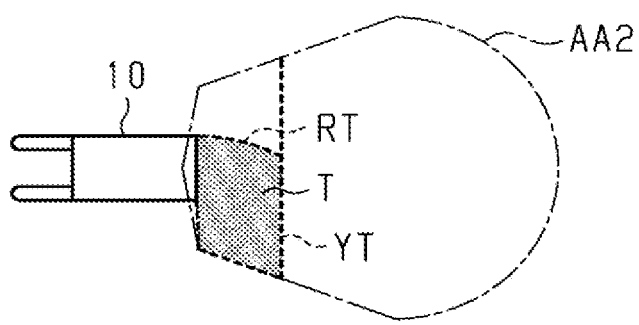
FIG. 6 is a view schematically illustrating a predicted trajectory when the forklift is turning.
Figure 7:
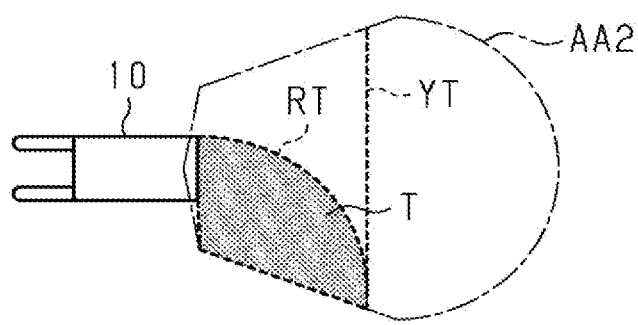
FIG. 7 is a view schematically illustrating a predicted trajectory when the vehicle speed of the forklift is increased in a state in which the forklift is turning.

As illustrated in FIG. 4 and FIG. 5, when the forklift 10 moves in a straight line, the predicted trajectory T becomes a trajectory that linearly extends from the forklift 10 in the backward movement direction. As illustrated in FIG. 6 and FIG. 7, when the forklift 10 is turning, the predicted trajectory T becomes a trajectory that curves from the forklift 10 in the backward movement direction. The predicted trajectory T extends to the right side when the forklift 10 is turning to the right side, and the predicted trajectory T extends to the left side when the forklift 10 is turning to the left side. In other words, the main controller 31 derives the predicted trajectory T that extends in the turning direction of the forklift 10 when the forklift 10 is turning.

The forklift 10 illustrated in FIG. 5 has a higher vehicle speed than the forklift 10 in the state illustrated in FIG. 4. Similarly, the forklift 10 illustrated in FIG. 7 has a higher vehicle speed than the forklift 10 illustrated in FIG. 6. As illustrated in FIG. 4 to FIG. 7, the main controller 31 extends the predicted trajectory T in the traveling direction of the forklift 10 as the vehicle speed of the vehicle body 11 increases. In this embodiment, a trajectory derivation threshold value YT is changed depending on the vehicle speed. The trajectory derivation threshold value YT is a threshold value set for the Y-coordinate in the world coordinate system, and the Y-coordinate is further separated from the forklift 10 as the vehicle speed increases. The main controller 31 derives the predicted trajectory T from the forklift 10 to the trajectory derivation threshold value YT. The expression of "extending the predicted trajectory T in the traveling direction as the vehicle speed of the vehicle body 11 increases" is not limited to an aspect in which the vehicle speed of the vehicle body 11 and the distance of the predicted trajectory T in the traveling direction are proportional to each other, and a correlation in which the distance of the predicted trajectory T in the traveling direction increases as the vehicle speed of the vehicle body 11 increases is simply needed.

The predicted trajectory T is derived within the automatic deceleration area AA2. In this embodiment, the main controller 31 functions as a predicted trajectory calculator.

The automatic deceleration control will be described below. The X-coordinate and the Y-coordinate in the description below are the X-coordinate and the Y-coordinate in the world coordinate system.

The automatic deceleration control includes travel stop control and vehicle speed limitation control. The travel stop control is stop control of the forklift 10. The vehicle speed limitation control is travelling authorization control of the forklift 10 at the vehicle-speed equal to or less than the upper-limit value.

Figures 8, 9:
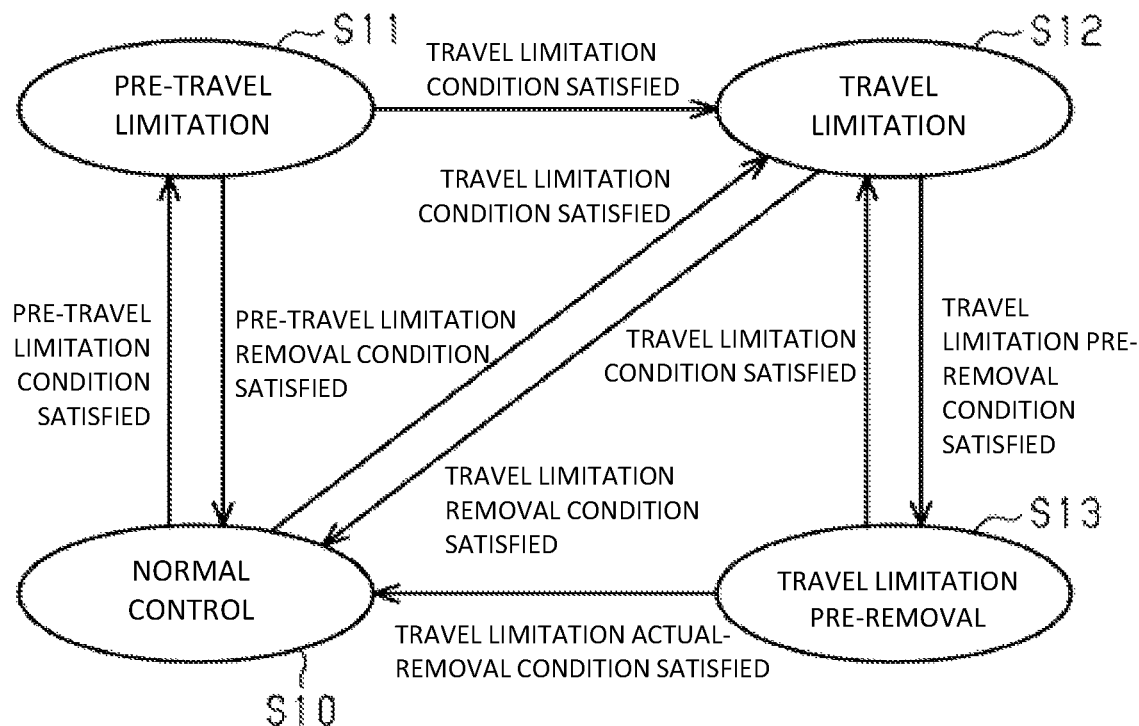
FIG. 8 is a state transition diagram of travel stop control.
FIG. 9 is a table showing the correspondence relationship among states to which a main controller transitions, a vehicle-speed upper-limit value, and an acceleration-rate upper-limit value.

As illustrated in FIG. 8, in the travel stop control, the main controller 31 is placed in one of a normal control state S10, a pre-travel-limitation state S11, a travel limitation state S12, and a travel limitation pre-removal state S13. As a result, control according to each state is performed.

As shown in FIG. 9, the normal control state S10 is a state in which a vehicle speed limitation is not performed. In the normal control state S10, an acceleration rate limitation is not performed either. When the main controller 31 is in the normal control state S10, the main controller 31 computes a target rotational speed of the engine 61 from an accelerator opening degree detected by the accelerator sensor 34. The target rotational speed increases as the accelerator opening degree increases. The main controller 31 determines whether to move the forklift 10 forward or backward based on the operation direction of the direction lever 17. The main controller 31 generates a rotational speed command including information indicating the target rotational speed and information indicating the operation direction of the direction lever 17. The main controller 31 transmits the rotational speed command to the travel controller 83. The travel controller 83 controls the engine 61 so that the engine 61 follows the target rotational speed. Specifically, the travel controller 83 adjusts the throttle opening degree by controlling the throttle actuator 62. As a result, the forklift 10 travels at a vehicle speed according to the operation amount of the accelerator pedal 16 by the operator. As described above, the main controller 31 controls the rotational speed of the engine 61 by transmitting the rotational speed command to the travel controller 83. Controlling the rotational speed of the engine 61 adjusts the driving force to be transmitted to the driving wheels 12 and 13. In other words, the main controller 31 adjusts the driving force to be transmitted to the driving wheels 12 and 13.

The state in which the vehicle speed limitation is not performed includes an aspect in which the vehicle-speed upper-limit value is not set, and further includes an aspect in which a vehicle-speed upper-limit value is set to a value that substantially does not function, e.g., a value higher than a maximum speed that may be reached by the forklift 10. Similarly, the state in which the acceleration rate limitation is not performed includes an aspect in which the acceleration-rate upper-limit value is not set, and further includes an aspect in which an acceleration-rate upper-limit value is set to a value that substantially does not function, e.g., a value higher than a maximum acceleration rate that may be reached by the forklift 10.

As illustrated in FIG. 8, when a pre-travel-limitation condition is satisfied while the main controller 31 is in the normal control state S10, the main controller 31 transitions to the pre-travel-limitation state S11. The satisfaction of the pre-travel-limitation condition means the satisfaction of both of Conditions A1 and A2 below.

Condition A1 . . . A person exists in a warning area.
Condition A2 . . . The forklift 10 is traveling in the backward movement direction.

The warning area is an area that is provided within the automatic deceleration area AA2 and different from an area in which the vehicle speed limitation is performed. The warning area is an area where a warning is given by the warning device 58 before a person enters the predicted trajectory T. The warning area of Condition A1 may be the whole of the automatic deceleration area AA2 excluding the inside of the predicted trajectory T, or may be a designated range that spreads outward of the predicted trajectory T.

Whether the forklift 10 is traveling in the backward movement direction is determined from the vehicle speed and the traveling direction of the forklift 10 computed by the main controller 31. When the traveling direction of the forklift 10 is the backward movement direction and the vehicle speed is higher than a stop determination threshold value [km/h], the main controller 31 determines that the forklift 10 is traveling in the backward movement direction. The stop determination threshold value is set to a value at which it is considered that the forklift 10 is stopped. As the stop determination threshold value, a value arbitrarily selected from 0 [km/h] to 3.0 [km/h] is set, for example.

The pre-travel-limitation state S11 is a state in which a warning is given by the warning device 58. In the pre-travel-limitation state S11, the vehicle speed limitation and the acceleration rate limitation are not performed. The warning is not given in the pre-travel-limitation state S11 at the time of a switchback of the forklift 10. The switchback is a motion of switching between the forward movement and the backward movement by operation of the direction lever 17. The main controller 31 turns on a switchback flag when the detection result of the direction sensor 35 and the traveling direction of the forklift 10 do not match each other. The main controller 31 does not cause the warning device 58 to give a warning when the main controller 31 transitions to the pre-travel-limitation state S11 in a state in which the switchback flag is turned on. The switchback flag is removed when the main controller 31 transitions from the pre-travel-limitation state S11 to another state, for example.

When a pre-travel-limitation removal condition is satisfied while the main controller 31 is in the pre-travel-limitation state S11, the main controller 31 transitions to the normal control state S10. The satisfaction of the pre-travel-limitation removal condition means the satisfaction of at least one of Conditions B1 or B2 below.

Condition B1 . . . A person does not exist on the predicted trajectory T and in the warning area.
Condition B2 . . . Traveling in the backward movement direction is stopped and backward movement operation is not performed.

The expression of "traveling in the backward movement direction is stopped" means that the vehicle speed of the forklift 10 becomes equal to or less than the stop determination threshold value from a state in which the vehicle speed is higher than the stop determination threshold value. That is, the traveling forklift 10 is stopped. A state in which the backward movement operation is not performed is formed when at least one of a state in which the accelerator pedal 16 is not operated or a state in which the detection result of the direction sensor 35 is not the backward movement is satisfied. The state in which the detection result of the direction sensor 35 is not the backward movement is a state in which the detection result of the direction sensor 35 is neutral or the forward movement.

When a travel limitation condition is satisfied while the main controller 31 is in the pre-travel-limitation state S11, the main controller 31 transitions to the travel limitation state S12. The satisfaction of the travel limitation condition means the satisfaction of both of Conditions C1 and C2 below.

Condition C1 . . . A person exists on the predicted trajectory T.
Condition C2 . . . The forklift 10 is traveling in the backward movement direction.

Whether Condition C1 is satisfied is determined from the X-coordinate and the Y-coordinate of a person. The predicted trajectory T is defined by the X-coordinate and the Y-coordinate, and hence it is determined whether a person exists on the predicted trajectory T from the X-coordinate and the Y-coordinate of the person. Condition C2 is the same condition as Condition A2.

As shown in FIG. 9, the travel limitation state S12 is a state in which the traveling forklift 10 is decelerated and stopped by setting the vehicle-speed upper-limit value to 0. The vehicle speed limitation is imposed on the vehicle body 11 by setting the vehicle-speed upper-limit value. The vehicle speed limitation of the vehicle body 11 means the vehicle speed limitation of the forklift 10. The main controller 31 performs control so that the driving force to the driving wheels 12 and 13 is cut off. The cut-off of the driving force to the driving wheels 12 and 13 is one aspect of adjustment of the driving force transmitted to the driving wheels 12 and 13. The main controller 31 cuts off the driving force to the driving wheels 12 and 13 by transmitting a cut-off command to the travel controller 83. When the travel controller 83 receives the cut-off command, the travel controller 83 controls the power transmission 70 so that the driving force of the engine 61 is not transmitted to the driving wheels 12 and 13. For example, the travel controller 83 controls the transmission 72 such that the clutches 74 and 76 are not respectively connected with the gear trains 75 and 77, and places the clutches 74 and 76 in a cut-off state. As a result, the forklift 10 is decelerated due to running resistance. When the forklift 10 is traveling on a flat road, the forklift 10 stops. The running resistance includes air resistance, rolling resistance, and gradient resistance. In the travel limitation state S12, the warning device 58 gives a warning.

As illustrated in FIG. 8, when a travel limitation removal condition is satisfied while the main controller 31 is in the travel limitation state S12, the main controller 31 transitions to the normal control state S10. The satisfaction of the travel limitation removal condition means the satisfaction of Condition D1 below.

Condition D1 . . . The traveling in the backward movement direction is stopped and the backward movement operation is not performed.

Condition D1 is the same condition as Condition B2.

When a travel limitation pre-removal condition is satisfied while the main controller 31 is in the travel limitation state S12, the main controller 31 transitions to the travel limitation pre-removal state S13. The satisfaction of the travel limitation pre-removal condition means the satisfaction of both of Conditions E1 and E2 below.

Condition E1 . . . A person does not exist on the predicted trajectory T.

Condition E2 . . . The forklift 10 is traveling in the backward movement direction.

In other words, Condition E1 is satisfied when Condition C1 is not satisfied. Condition E2 is the same condition as Condition A2.

As shown in FIG. 9, the travel limitation pre-removal state S13 is a state in which an acceleration rate limitation is performed while the vehicle speed limitation is removed. The main controller 31 sets the acceleration-rate upper-limit value to AS1 [m/s2], and performs control so that the acceleration rate of the forklift 10 does not exceed AS1. The value AS1 is a value larger than 0 and lower than the maximum acceleration rate that may be reached by the forklift 10. The main controller 31 permits the acceleration of the forklift 10 at AS1 or less. In order to perform an acceleration rate limitation, the main controller 31 performs control so that the acceleration rate of the forklift 10 does not exceed the acceleration-rate upper-limit value. For example, the main controller 31 limits the increase of the rotational speed of the engine 61 to perform acceleration rate limitation. Specifically, the main controller 31 transmits a command to the travel controller 83 so that the travel controller 83 limits the increase of the rotational speed of the engine 61. The travel controller 83 limits the increase of the rotational speed of the engine 61 per unit time so as to perform control so that the acceleration rate of the forklift 10 does not exceed AS1. In the travel limitation pre-removal state S13, the warning device 58 does not give a warning.

As illustrated in FIG. 8, when a travel limitation actual-removal condition is satisfied while the main controller 31 is in the travel limitation pre-removal state S13, the main controller 31 transitions to the normal control state S10. The satisfaction of the travel limitation actual-removal condition means the satisfaction of at least one of Conditions F1 or F2 below.

Condition F1 . . . The vehicle speed of the forklift 10 reaches a value obtained by subtracting a first predetermined value from a target vehicle speed.

Condition F2 . . . The backward movement operation is not performed.

In other words, Condition F1 is that a velocity deviation between the target vehicle speed and the vehicle speed of the forklift 10 becomes less than the first predetermined value. In the travel limitation pre-removal state S13, the speed followability of the forklift 10 decreases since an acceleration rate limitation is performed, so that it becomes difficult for the vehicle speed of the forklift 10 to reach the target vehicle speed. The first predetermined value is set in order to determine that the vehicle speed of the forklift 10 has reached the target vehicle speed intended by the operator in a state in which an acceleration rate limitation is performed. As the first predetermined value, a value arbitrarily selected from 0.5 [km/h] to 2.0 [km/h] is set, for example.

When the travel limitation condition is satisfied while the main controller 31 is in the travel limitation pre-removal state S13, the main controller 31 transitions to the travel limitation state S12. Similarly, when the travel limitation condition is satisfied while the main controller 31 is in the normal control state S10, the main controller 31 transitions to the travel limitation state S12.

As described above, the main controller 31 extends the predicted trajectory T in the traveling direction as the vehicle speed of the vehicle body 11 increases. If the main controller 31 transitions to the travel limitation state S12 and the predicted trajectory T is shortened in the traveling direction as the vehicle speed of the vehicle body 11 decreases, the person is likely be placed on the outside of the predicted trajectory T. As a result, the main controller 31 alternately transitions to the travel limitation state S12 and the travel limitation pre-removal state S13 even though the forklift 10 and the person are becoming closer to each other. In order to prevent this situation, the main controller 31 maintains the distance of the predicted trajectory T in the traveling direction, i.e., the trajectory derivation threshold value YT regardless of the vehicle speed of the vehicle body 11 when a person is detected on the predicted trajectory T. The maintenance of the trajectory derivation threshold value YT is removed, for example, when a person no longer exists on the predicted trajectory T.

Next, the vehicle speed limitation control will be described. As the vehicle speed limitation control, different controls are performed depending on a case where the object is a person or a case where the object is an obstacle. The state transition diagrams are the same for the case where the object is a person and the case where the object is an obstacle, and hence the vehicle speed limitation control for both of the cases will be described with reference to FIG. 10. First, the vehicle speed limitation control for the case where the object is a person will be described.

Figure 10:
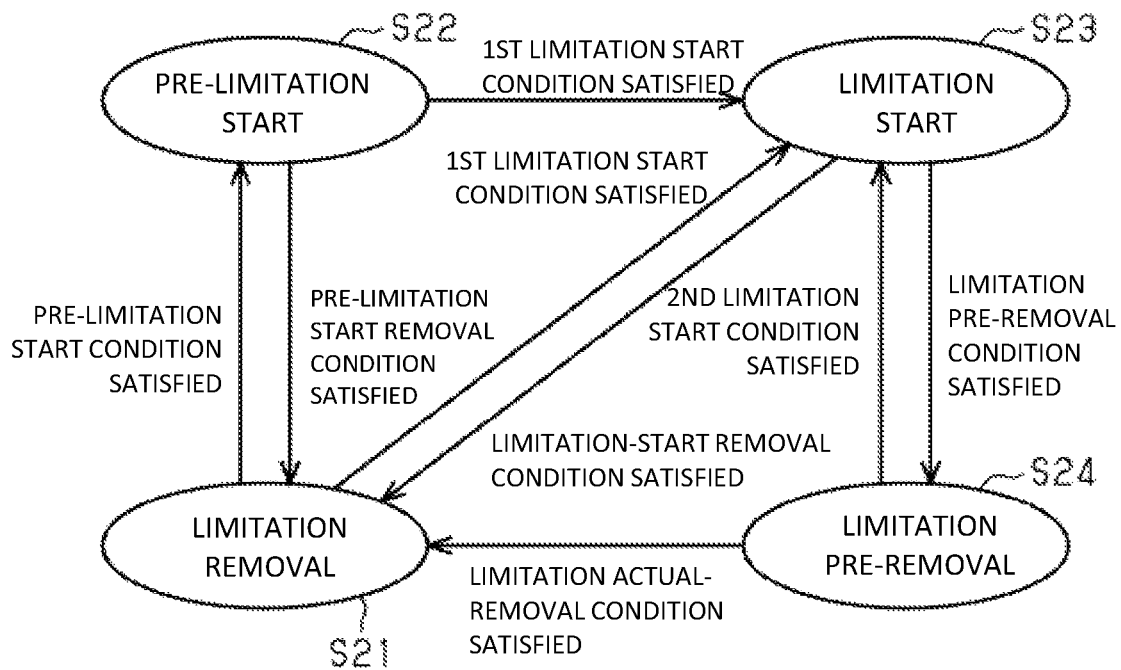
FIG. 10 is a state transition diagram of vehicle speed limitation control.

As illustrated in FIG. 10, in the vehicle speed limitation control, the main controller 31 is placed in one of a limitation removal state S21, a pre-limitation-start state S22, a limitation start state S23, and a limitation pre-removal state S24. As a result, control is performed according to each state.

As shown in FIG. 9, the limitation removal state S21 is a state in which the vehicle speed limitation is not performed. In the limitation removal state S21, the acceleration rate limitation is not performed either.

As illustrated in FIG. 10, when a pre-limitation-start condition is satisfied while the main controller 31 is in the limitation removal state S21, the main controller 31 transitions to the pre-limitation-start state S22. The satisfaction of the pre-limitation-start condition means the satisfaction of both of Conditions G1 and G2 below.

Condition G1 . . . A person exists in an advance warning area within the automatic deceleration area AA2.

Condition G2 . . . The forklift 10 is traveling in the backward movement direction.

The advance warning area is an area far away from the forklift 10 as compared to a vehicle speed limitation area in which the vehicle speed limitation is performed. The vehicle speed limitation area is an area within the automatic deceleration area AA2 and outside the predicted trajectory T and where the vehicle speed limitation is performed. The vehicle speed limitation may not be performed at a place within the automatic deceleration area AA2 and far away from the forklift 10. That is, the automatic deceleration area AA2 includes both of the vehicle speed limitation area in which the vehicle speed limitation is performed and an area which is far away from the forklift 10 as compared to the vehicle speed limitation area and in which the vehicle speed limitation is not performed. The vehicle speed limitation area is a region that spreads rightward, leftward, and rearward of the predicted trajectory T. The vehicle speed limitation area is determined based on the vehicle speed of the forklift 10 and the predicted trajectory T. The advance warning area is derived from the vehicle speed of the forklift 10 and the vehicle-speed upper-limit value set according to the position of a person. The advance warning area is set so that the amount of time from when a person enters the advance warning area to when the person enters the vehicle speed limitation area is within a predetermined amount of time. Examples of the predetermined amount of time include 1 second to 3 seconds.

The pre-limitation-start state S22 is a state in which the warning device 58 gives a warning. In other words, the pre-limitation-start state S22 is a state where the warning device 58 warns the operator about a possibility of a vehicle speed limitation before the vehicle speed limitation is actually performed. In the pre-limitation-start state S22, the vehicle speed limitation and the acceleration rate limitation are not performed. As with the case for the pre-travel-limitation state S11, a warning is not given at the time of the switchback of the forklift 10 in the pre-limitation-start state S22.

When a pre-limitation-start removal condition is satisfied while the main controller 31 is in the pre-limitation-start state S22, the main controller 31 transitions to the limitation removal state S21. The satisfaction of the pre-limitation-start removal condition means the satisfaction of at least one of Conditions H1 or H2 below.

Condition H1 . . . A person does not exist in the vehicle speed limitation area and the advance warning area.

Condition H2 . . . The traveling in the backward movement direction is stopped and the backward movement operation is not performed.

When a first limitation start condition is satisfied while the main controller 31 is in the pre-limitation-start state S22, the main controller 31 transitions to the limitation start state S23. The satisfaction of the first limitation start condition means the satisfaction of both of Conditions I1 and I2 below.

Condition I1 . . . A person exists in the vehicle speed limitation area within the automatic deceleration area AA2.

Condition I2 . . . The forklift 10 is traveling in the backward movement direction.

As shown in FIG. 9, the limitation start state S23 is a state in which the vehicle speed limitation is imposed on the forklift 10 because a person exists in the vehicle speed limitation area within the automatic deceleration area AA2. The vehicle-speed upper-limit value falls as the distance from the forklift 10 to the person decreases. In the storage unit 33 of the main controller 31 or a storage medium, such as an external storage apparatus, a map in which the vehicle-speed upper-limit value is linked to the distance from the forklift 10 to the person is stored. The main controller 31 sets a map value that is a vehicle-speed upper-limit value in accordance with the map to the vehicle-speed upper-limit value. The vehicle-speed upper-limit value is not limited to an aspect in which the vehicle-speed upper-limit value falls in proportion to the decrease in the distance from the forklift 10 to the person, and a correlation in which the vehicle-speed upper-limit value falls when the distance from the forklift 10 to the person is simply needed. When there are multiple people in the vehicle speed limitation area within the automatic deceleration area AA2, the vehicle-speed upper-limit value is determined according to the position of one of the people closest to the forklift 10.

The vehicle-speed upper-limit value set in the limitation start state S23 is a value larger than 0. When the vehicle-speed upper-limit value is set in the limitation start state S23, the main controller 31 performs control so that a force acts in the direction in which the movement of the vehicle body 11 is prevented, so as to prevent the vehicle speed of the vehicle body 11 from exceeding the vehicle-speed upper-limit value. The main controller 31 sets a limitation value to the target rotational speed of the engine 61 to perform control so that the vehicle speed of the vehicle body 11 does not exceed the vehicle-speed upper-limit value. The lowest value of the limitation value corresponds to an idling rotational speed. The main controller 31 transmits a rotational speed command including a target rotational speed corresponding to the accelerator opening degree to the travel controller 83 when the target rotational speed corresponding to the accelerator opening degree is equal to or less than the limitation value. When the target rotational speed corresponding to the accelerator opening degree is more than the limitation value, the main controller 31 transmits, to the travel controller 83, a rotational speed command for setting the limitation value to the target rotational speed. The travel controller 83 performs control of the throttle actuator 62 so that the rotational speed of the engine 61 reaches the limitation value. As a result, the forklift 10 is decelerated by engine braking. The engine braking causes a force to act on the forklift 10 in the direction in which the movement of the vehicle body 11 is prevented. The forklift 10 is decelerated until the rotational speed of the engine 61 reaches a vehicle speed corresponding to the limitation value. In the limitation start state S23, the warning device 58 gives a warning.

As illustrated in FIG. 10, when a limitation-start removal condition is satisfied while the main controller 31 is in the limitation start state S23, the main controller 31 transitions to the limitation removal state S21. The satisfaction of the limitation-start removal condition means the satisfaction of Condition J1 below. When the first limitation start condition is satisfied while the main controller 31 is in the limitation removal state S21, the main controller 31 transitions to the limitation start state S23.

Condition J1 . . . The traveling in the backward movement direction is stopped and the backward movement operation is not performed.

When a limitation pre-removal condition is satisfied while the main controller 31 is in the limitation start state S23, the main controller 31 transitions to the limitation pre-removal state S24. The satisfaction of the limitation pre-removal condition means the satisfaction of Condition K1 below.

Condition K1 . . . A person does not exist in the vehicle speed limitation area within the automatic deceleration area AA2.

As shown in FIG. 9, the limitation pre-removal state S24 is a state in which the acceleration rate limitation is performed by setting the acceleration-rate upper-limit value to AS2 [m/s2] while the vehicle speed limitation is removed. The value AS2 is a value that is larger than 0 and lower than the maximum acceleration rate reached by the forklift 10. The main controller 31 permits the acceleration of the forklift 10 at AS2 or less. The value AS2 may be the same value as AS1 or a different value from AS1.

As illustrated in FIG. 10, when a second limitation start condition is satisfied while the main controller 31 is in the limitation pre-removal state S24, the main controller 31 transitions to the limitation start state S23. The satisfaction of the second limitation start condition means the satisfaction of Condition L1 below.

Condition L1 . . . A person exists in the vehicle speed limitation area within the automatic deceleration area AA2.

When a limitation actual-removal condition is satisfied while the main controller 31 is in the limitation pre-removal state S24, the main controller 31 transitions to the limitation removal state S21. The satisfaction of the limitation actual-removal condition means the satisfaction of at least one of Conditions M1 or M2 below.

Condition M1 . . . The vehicle speed of the forklift 10 reaches a value obtained by subtracting a second predetermined value from the target vehicle speed.

Condition M2 . . . The backward movement operation is not performed.

In other words, in Condition M1, a velocity deviation between the target vehicle speed and the vehicle speed of the forklift 10 becomes less than the second predetermined value. In the limitation pre-removal state S24, the speed followability of the forklift 10 decreases since the acceleration rate limitation is performed, so that it becomes difficult for the vehicle speed of the forklift 10 to reach the target vehicle speed. The second predetermined value is set in order to determine that the vehicle speed of the forklift 10 has reached the target vehicle speed intended by the operator in a state in which an acceleration rate limitation is performed. As the second predetermined value, a value arbitrarily selected from 0.5 [km/h] to 2.0 [km/h] is set, for example. The second predetermined value may be the same value as the first predetermined value or a different value from the first predetermined value.

As with the case of the travel stop control, the main controller 31 may maintain the trajectory derivation threshold value YT when a person existing in the vehicle speed limitation area is detected.

Next, the vehicle speed limitation control will be described for the case where the object is an obstacle. The following description will focus on differences between the case where the object is a person and the case where the object is an obstacle, and will not elaborate similarity between both cases.

The satisfaction of the pre-limitation-start condition for the case where the object is an obstacle means the satisfaction of both of Conditions N1 and N2 below.

Condition N1 . . . An obstacle exists in the advance warning area within the automatic deceleration area AA2.

Condition N2 . . . The forklift 10 is traveling in the backward movement direction.

The advance warning area is an area far away from the forklift 10 as compared to the vehicle speed limitation area. The advance warning area is derived from the vehicle speed of the forklift 10 and a vehicle-speed upper-limit value set according to the position of the obstacle, and is set so that the amount of time from when the obstacle enters the advance warning area to when the obstacle enters the vehicle speed limitation area is within a predetermined amount of time. Examples of the predetermined amount of time include 1 second to 3 seconds. When the object is an obstacle, the advance warning area is at least one of an area within the predicted trajectory T and far away from the forklift 10 as compared to the vehicle speed limitation area or an area outside the predicted trajectory T and an extension of the predicted trajectory T.

The vehicle speed limitation area when the object is an obstacle is an area that is within the automatic deceleration area AA2 and also within the predicted trajectory T. The case where the object is an obstacle is different from the case where the object is a person in that the vehicle speed limitation area is set within the predicted trajectory T. In other words, when an obstacle exists on the predicted trajectory T, the main controller 31 performs control so that a force acts in the direction in which the movement of the vehicle body 11 is prevented, so as to prevent the vehicle speed of the vehicle body 11 from exceeding the vehicle-speed upper-limit value. As with the case where the object is a person, the main controller 31 prevents the vehicle speed of the vehicle body 11 from exceeding the vehicle-speed upper-limit value by engine braking.

The pre-limitation-start removal condition, the first limitation start condition, the limitation-start removal condition, the limitation pre-removal condition, the second limitation start condition, and the limitation actual-removal condition are also applied in a case where the object is an obstacle, instead of a person.

The vehicle-speed upper-limit value imposed on the forklift 10 when the object is an obstacle falls as the distance from the forklift 10 to the obstacle decreases. In the storage unit 33 of the main controller 31 or a storage medium, such as an external storage apparatus, a map in which the vehicle-speed upper-limit value is linked to the distance from the forklift 10 to the obstacle is stored. The main controller 31 sets the vehicle-speed upper-limit value from the map. The vehicle-speed upper-limit value imposed on the forklift 10 when the object is an obstacle is a value larger than 0. The vehicle-speed upper-limit value is not limited to an aspect in which the vehicle-speed upper-limit value falls in proportion to the decrease in the distance from the forklift 10 to the obstacle, and a correlation in which the vehicle-speed upper-limit value falls when the distance from the forklift 10 to the obstacle decreases is simply needed.

As described above, the main controller 31 sets the vehicle-speed upper-limit value according to the state. In this embodiment, the main controller 31 functions as a vehicle-speed upper-limit setter.

Functions of this embodiment will be described.

When a person enters the warning area while the forklift 10 is traveling, the main controller 31 transitions to the pre-travel-limitation state S11. The main controller 31 causes the warning device 58 to give a warning to the operator so that the operator recognizes a possibility that a person may enter the predicted trajectory T. When the operator turns the forklift 10 in a direction in which the operator moves away from the person or stops the forklift 10 so as not to perform the backward movement, the main controller 31 transitions to the normal control state S10. When the person enters the predicted trajectory T in a state in which the main controller 31 is placed in the pre-travel-limitation state S11, the main controller 31 transitions to the travel limitation state S12. The main controller 31 sets the vehicle-speed upper-limit value to 0, so that the forklift 10 stops. At this time, the main controller 31 cuts off the transmission of the driving force of the engine 61 to the driving wheels 12 and 13. As a result, the forklift 10 is decelerated by the running resistance and the forklift 10 then stops.

The forklift 10 is stopped when the main controller 31 transitions to the travel limitation state S12. When the backward movement operation is not performed by the operator in this situation, the main controller 31 transitions to the normal control state S10. When the travel limitation condition is satisfied while the main controller 31 is in the normal control state S10, the main controller 31 transitions to the travel limitation state S12 without being placed in the pre-travel-limitation state S11. A situation in which the travel limitation condition is satisfied without the satisfaction of the pre-travel-limitation condition may be, for example, a situation where the speed of the forklift 10 is relatively high or a situation in which an object enters the predicted trajectory T from a blind spot of a detection of the object detector 51.

When a person no longer exists on the predicted trajectory T before the forklift 10 is stopped while the main controller 31 is in the travel limitation state S12, the main controller 31 transitions to the travel limitation pre-removal state S13. When a person enters the predicted trajectory T again after the main controller 31 transitions to the travel limitation pre-removal state S13, the main controller 31 transitions to the travel limitation state S12. In the travel limitation pre-removal state S13, the acceleration rate limitation is performed. In the travel limitation state S12, the vehicle speed limitation is performed, and hence the velocity deviation may increase. Therefore, the forklift 10 is gradually accelerated by placement of the main controller 31 in the travel limitation pre-removal state S13 before the main controller 31 transitions from the travel limitation state S12 to the normal control state S10.

When the forklift 10 is accelerated and the velocity deviation decreases while the travel limitation pre-removal state S13 is maintained, the main controller 31 transitions to the normal control state S10. Since the acceleration rate limitation is performed in the travel limitation pre-removal state S13, the acceleration of the forklift 10 is not efficiently performed. When the acceleration is desired to be efficiently performed, an accelerator is released so as to remove the travel limitation pre-removal state S13, which leads to workability improvement.

As described above, when a person enters the predicted trajectory T in a state in which the forklift 10 is moving backward, the travel stop control functions to stop the forklift 10. In this situation, the person is positioned behind the forklift 10 while the forklift 10 is moving backward. Accordingly, the vehicle-speed upper-limit value is set when the traveling direction of the forklift 10 is a direction toward the person.

When an obstacle enters the advance warning area while the forklift 10 is traveling, the main controller 31 transitions to the pre-limitation-start state S22. The main controller 31 causes the warning device 58 to give a warning to the operator so that the operator recognizes a nearby obstacle. When the operator turns the forklift 10 in a direction in which the operator moves away from the obstacle or stops the forklift 10 so as not to perform the backward movement, the main controller 31 transitions to the limitation removal state S21. When the obstacle enters the vehicle speed limitation area in a state in which the main controller 31 is placed in the pre-limitation-start state S22, the main controller 31 transitions to the limitation start state S23. The main controller 31 sets the vehicle-speed upper-limit value to a value in accordance with the map. At this time, the forklift 10 is decelerated by engine braking.

In the limitation start state S23, although the vehicle-speed upper-limit value is set, the traveling of the forklift 10 is permitted at the vehicle-speed upper-limit value or less. This allows the operator to drive the forklift 10 while avoiding the obstacle. When the limitation-start removal condition is satisfied while the main controller 31 is in the limitation start state S23, the main controller 31 transitions to the limitation removal state S21 to remove the vehicle speed limitation.

When the operator maintains traveling of the forklift 10 in the limitation start state S23 and an obstacle no longer exists in the vehicle speed limitation area, the main controller 31 transitions to the limitation pre-removal state S24. As a result, the vehicle speed limitation is removed. The acceleration rate limitation is performed in the limitation pre-removal state S24. In the limitation start state S23, the vehicle speed limitation is imposed, and hence the velocity deviation may increase. Therefore, the forklift 10 is gradually accelerated by placement of the main controller 31 in the limitation pre-removal state S24 before the main controller 31 transitions from the limitation start state S23 to the limitation removal state S21.

When the forklift 10 is accelerated and the velocity deviation decreases while the limitation pre-removal state S24 is maintained, the main controller 31 transitions to the limitation removal state S21. Since the acceleration rate limitation is performed in the limitation pre-removal state S24, the acceleration of the forklift 10 is not efficiently performed. When the acceleration is desired to be efficiently performed, the accelerator is released so as to remove the limitation pre-removal state S24, which leads to workability improvement. When the operator changes the traveling direction of the forklift 10 to the forward movement direction while the main controller 31 is in the limitation pre-removal state S24, the main controller 31 transitions to the limitation removal state S21. When the obstacle enters the vehicle speed limitation area again before the main controller 31 transitions from the limitation pre-removal state S24 to the limitation removal state S21, the main controller 31 transitions to the limitation start state S23.

As described above, when the obstacle enters the vehicle speed limitation area set within the predicted trajectory T in a state in which the forklift 10 is moving backward, the vehicle speed limitation control for the obstacle functions to perform the vehicle speed limitation. Meanwhile, when the obstacle exists outside the predicted trajectory T, the vehicle speed limitation is not performed. In this situation, the obstacle is positioned behind the forklift 10 while the forklift 10 is moving backward. Accordingly, the vehicle-speed upper-limit value is set when the traveling direction of the forklift 10 is a direction toward the obstacle.

In this embodiment, the state transitions are performed in parallel among controls such as the travel stop control, the vehicle speed limitation control for a person, and the vehicle speed limitation control for an obstacle. Therefore, there is a possibility that vehicle-speed upper-limit value and the warning aspect may be different among the state transitions. In this case, control corresponding to any one of the states simply needs to be performed upon priority levels set in advance. For example, the main controller 31 performs control corresponding a state in which the vehicle-speed upper-limit value becomes the lowest.

Effects of this embodiment will be described.

(1) The main controller 31 performs the vehicle speed limitation when the object is positioned on the predicted trajectory T and the traveling direction of the vehicle body 11 is the direction toward the object. The predicted trajectory T is a trajectory that is predicted to be followed by the forklift 10. Therefore, the contact between the forklift 10 and the object is suitably avoided by the vehicle speed limitation performed when the object is positioned on the predicted trajectory T.

The main controller 31 controls the engine 61 so that the vehicle speed of the vehicle body 11 does not exceed the vehicle-speed upper-limit value. When the vehicle speed of the vehicle body 11 is higher than the vehicle-speed upper-limit value, the main controller 31 performs the control so that the force acts in the direction in which the movement of the vehicle body 11 is prevented and the control so that the driving force to the driving wheels 12 and 13 is cut off. Since engine braking provides deceleration at a relatively low deceleration rate, the forklift 10 is gradually decelerated. When the driving force to the driving wheels 12 and 13 is cut off, the forklift 10 is decelerated by the running resistance. Since the running resistance provides the deceleration at a relatively low deceleration rate, the forklift 10 is gradually decelerated. This allows the vehicle speed limitation to be imposed on the forklift 10 while suppressing the occurrence of a load collapse.

(2) The main controller 31 performs both of the control so that the force acts in the direction in which the movement of the vehicle body 11 is prevented and the control so that the driving force to the driving wheels 12 and 13 is cut off. In the embodiment, the driving force to the driving wheels 12 and 13 is cut off in the travel limitation state S12. In the limitation start state S23, engine braking causes a force to act in the direction in which the movement of the vehicle body 11 is prevented. The driving force to the driving wheels 12 and 13 is cut off in the travel limitation state S12 so as to stop the forklift 10. In the limitation start state S23, engine braking decelerates the forklift 10 because the forklift 10 does not need to be stopped. That is, the forklift 10 is decelerated according to the situation.

(3) The main controller 31 extends the predicted trajectory T in the traveling direction as the vehicle speed of the vehicle body 11 increases. The amount of time it takes for the vehicle body 11 to reach the object is decreases as the vehicle speed of the vehicle body 11 increases. This achieves an appropriate vehicle speed limitation which corresponds to the vehicle speed of the vehicle body 11.

The embodiment may be modified as below. The embodiment and modifications below may be combined with each other within a range in which a technical contradiction does not arise.

Figure 11:
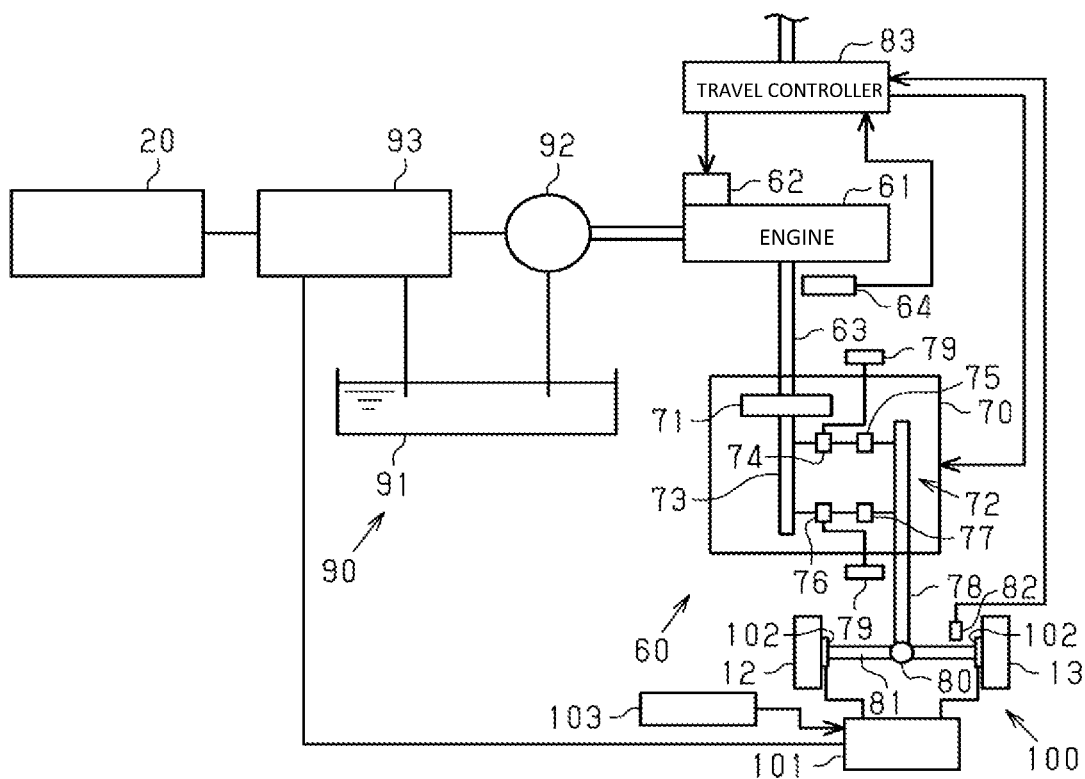
FIG. 11 is a schematic configuration diagram of a forklift of a modification.

As illustrated in FIG. 11, the forklift 10 may include a brake mechanism 100. The brake mechanism 100 includes a brake actuator 101, brake wheel cylinders 102, and a brake controller 103.

The brake actuator 101 is an actuator that controls hydraulic oil supplied to the brake wheel cylinders 102. The brake actuator 101 controls the supply of the hydraulic oil by a solenoid valve, for example.

The brake wheel cylinders 102 are respectively provided in the driving wheels 12 and 13. Alternatively, the brake wheel cylinders 102 may be respectively provided in the steered wheels 14. Each of the brake wheel cylinders 102 presses brake pads against a brake disc by using the hydraulic oil supplied from the brake actuator 101 so as to generate a friction braking force.

The hardware configuration of the brake controller 103 is similar to that of the travel controller 83, for example. The brake controller 103 controls the brake actuator 101 in accordance with a command from the main controller 31. In other words, the main controller 31 controls the brake mechanism 100 by transmitting a command to the brake controller 103.

The main controller 31 performs deceleration by the brake mechanism 100 in addition to deceleration by the running resistance, thereby preventing the vehicle speed of the vehicle body 11 from exceeding the vehicle-speed upper-limit value. For example, when the forklift 10 is decelerated in the travel limitation state S12, the main controller 31 cuts off the driving force to the driving wheels 12 and 13 by transmitting a cut-off command to the travel controller 83. The main controller 31 also transmits a braking command to the brake controller 103. Upon receiving the braking command, the brake controller 103 controls the brake actuator 101 so that hydraulic oil is supplied to the brake wheel cylinders 102. The brake controller 103 performs control so that the deceleration rate of the forklift 10 becomes equal to or less than a deceleration rate limitation value [m/s2] determined in advance. The deceleration rate limitation value is a value larger than 0 and lower than the maximum deceleration rate of the forklift 10. As a result, the load collapse at the time of deceleration is suppressed. The forklift 10 is decelerated at a deceleration rate equal to or less than the deceleration rate limitation value and the forklift 10 then stops.

The main controller 31 performs deceleration by the brake mechanism 100 in addition to deceleration by engine braking, thereby preventing the vehicle speed of the vehicle body 11 from exceeding the vehicle-speed upper-limit value. For example, in the vehicle speed limitation control for an obstacle, when the forklift 10 is decelerated in the limitation start state S23, the main controller 31 causes engine braking to act by transmitting a rotational speed command to the travel controller 83. The main controller 31 also transmits a braking command to the brake controller 103. The brake controller 103 performs control so that the deceleration rate of the forklift 10 becomes equal to or less than the deceleration rate limitation value [m/s2] determined in advance.

Providing the brake mechanism 100 allows the deceleration rate of the forklift 10 to be adjusted. Providing the brake mechanism 100 further allows the forklift 10 to stop during the forklift 10 is moving on a ramp.

When the forklift 10 includes the brake mechanism 100, the deceleration rate at the time of deceleration of the forklift 10 may be a value that decreases as the weight of the load increases. In this case, the forklift 10 is decelerated more gradually as the weight of the load increases. Similarly, when the forklift 10 includes the brake mechanism 100, the deceleration rate at the time of deceleration of the forklift 10 may be a value that decreases as the lifting height of the load handling apparatus 20 increases. In this case, the forklift 10 is decelerated more gradually as the lifting height of the load handling apparatus 20 increases. When the forklift 10 includes the brake mechanism 100, the deceleration rate at the time of deceleration of the forklift 10 may be a value that decreases as the lifting height of the load handling apparatus 20 increases and also decreases as the weight of the load increases.

The main controller 31 may prevent the vehicle speed of the vehicle body 11 from exceeding the vehicle-speed upper-limit value simply by the deceleration by engine braking. For example, when the forklift 10 is decelerated in the travel limitation state S12, the main controller 31 sets a limitation value to the rotational speed of the engine 61. The main controller 31 transmits a rotational speed command to the travel controller 83 so that the rotational speed of the engine 61 does not exceed the limitation value. The forklift 10 is decelerated by engine braking. In this case, the vehicle speed of the vehicle body 11 does not fall below a vehicle speed corresponding to the idle speed of the engine 61, so that the forklift 10 does not stop.

The main controller 31 may combine the deceleration by engine braking and the abovementioned deceleration by the brake mechanism 100 with each other. That is, the deceleration by engine braking and the deceleration by the brake mechanism 100 may be performed in both of the travel limitation state S12 and the limitation start state S23 for an obstacle. In this case, the main controller 31 does not perform control to cut off the driving force to the driving wheels 12 and 13.

The main controller 31 may prevent the vehicle speed of the vehicle body 11 from exceeding the vehicle-speed upper-limit value simply by the deceleration by the running resistance. For example, in the limitation start state S23 for an obstacle, the main controller 31 transmits a cut-off command to the travel controller 83. The forklift 10 is decelerated by the running resistance. In this case, the vehicle-speed upper-limit value set in the limitation start state S23 becomes 0.

The main controller 31 may combine the deceleration by the running resistance and the abovementioned deceleration by the brake mechanism 100 with each other. That is, the deceleration by the running resistance and the deceleration by the brake mechanism 100 may be performed in both of the travel limitation state S12 and the limitation start state S23 for an obstacle. In this case, the main controller 31 does not perform control of setting a limitation value to the target rotational speed of the engine 61.

The main controller 31 may decelerate the forklift 10 by both of the deceleration by engine braking and the deceleration by the running resistance when the main controller 31 decelerates the forklift 10 in the travel limitation state S12. The main controller 31 performs the deceleration by engine braking by transmitting a rotational speed command to the travel controller 83 when the main controller 31 transitions to the travel limitation state S12. The target rotational speed included in the rotational speed command is the idle-speed, for example. The forklift 10 is decelerated by engine braking. When the vehicle speed of the vehicle body 11 falls below a threshold value, the main controller 31 transmits a cut-off command to the travel controller 83. Examples of the threshold value include a vehicle speed corresponding to the idle-speed. The travel controller 83 cuts off the driving force to the driving wheels 12 and 13. The forklift 10 is further decelerated by the running resistance. When the forklift 10 is moving on a flat road, the forklift 10 stops. As above, the combination of the deceleration by engine braking and the deceleration by the running resistance allows the forklift 10 to stop while being decelerated at a deceleration rate higher than the rate of deceleration by the running resistance. A control aspect as described above is one aspect in which both of the control so that the force acts in the direction in which the movement of the vehicle body 11 is prevented and the control so that the driving force to the driving wheels 12 and 13 is cut off.

The main controller 31 may transmit a torque command to the travel controller 83 instead of the rotational speed command. The torque command includes a target torque. The main controller 31 increases the target torque as the accelerator opening degree increases. The travel controller 83 performs control of the throttle actuator 62 so that the torque of the engine 61 follows the target torque. The main controller 31 sets a limitation value to the target torque when the vehicle speed limitation is imposed on the forklift 10.

As the engine 61, a liquefied petroleum gas engine may be used. In this case, the driving force to the driving wheels 12 and 13 is adjusted by the adjustment of the throttle opening degree by the throttle actuator 62.

The engine 61 may be a diesel engine. In this case, the driving force to the driving wheels 12 and 13 is adjusted by an adjustment of the fuel injection amount by the travel controller 83.

The forklift 10 may be a vehicle including a hydro-static transmission (HST) instead of the torque converter 71, the transmission 72, and the like.

The vehicle-speed upper-limit value set in the limitation start state S23 may be a value that decreases as the lifting height of the load handling apparatus 20 increases.

The vehicle-speed upper-limit value set in the limitation start state S23 may be a value that decreases as the weight of the load increases.

The vehicle-speed upper-limit value set in the limitation start state S23 may be a value that decreases as the lifting height of the load handling apparatus 20 increases and decreases as the weight of the load increases. That is, the two abovementioned modifications describing the vehicle-speed upper-limit value may be combined together.

The acceleration-rate upper-limit value set in the limitation pre-removal state S24 may be a value that decreases as the lifting height of the load handling apparatus 20 increases. In this case, the forklift 10 is accelerated more gradually as the lifting height of the load handling apparatus 20 increases.

The acceleration-rate upper-limit value set in the limitation pre-removal state S24 may be a value that decreases as the weight of the load increases. In this case, the forklift 10 is accelerated more gradually as the weight of the load increases.

The acceleration-rate upper-limit value set in the limitation pre-removal state S24 may be a value that decreases as the lifting height of the load handling apparatus 20 increases and decreases as the weight of the load increases. That is, the two abovementioned modifications describing the acceleration-rate upper-limit value may be combined together.

The forklift 10 does not necessarily include the lifting height sensor 37 when neither of the vehicle-speed upper-limit value nor the acceleration-rate upper-limit value is changed depending on the lifting height of the load handling apparatus 20.

The forklift 10 does not necessarily include the weight sensor 38 when neither of the vehicle-speed upper-limit value nor the acceleration-rate upper-limit value is changed depending on the weight of the load.

The vehicle-speed upper-limit value set in the limitation start state S23 is not necessarily changed depending on the distance from the forklift 10 to the object. That is, the vehicle-speed upper-limit value set in the limitation start state S23 may be a fixed value.

The main controller 31 does not necessarily extend the length of the predicted trajectory T in the traveling direction of the forklift 10 as the vehicle speed of the vehicle body 11 increases. In this case, the distance of the predicted trajectory T in the traveling direction is a fixed distance determined in advance.

The main controller 31 does not necessarily change the predicted trajectory T depending on the steering angles of the steered wheels 14. That is, the predicted trajectory T may be the predicted trajectory T formed in the case where the forklift 10 moves in a straight line in the backward movement direction regardless of whether the forklift 10 is turning.

The main controller 31 may set, in addition to the region between the trajectory LT followed by the left end LE of the vehicle body 11 and the trajectory RT followed by the right end RE of the vehicle body 11, a region that expands outwardly from the trajectory LT and the trajectory RT and extends along the trajectory LT and the trajectory RT as the predicted trajectory T. That is the predicted trajectory T may be a region obtained by adding a margin, which spreads in the vehicle width direction of the forklift 10, to the region through which the forklift 10 is predicted to pass.

The main controller 31 may derive the predicted trajectory T from a map in which the vehicle speed of the vehicle body 11 and the steering angles and the X-coordinate and the Y-coordinate are linked to each other.

The main controller 31 does not necessarily perform different controls depending on whether the object is a person or an obstacle. Specifically, when the main controller 31 performs the automatic deceleration control, the main controller 31 may stop the traveling of the forklift 10 when an object exists on the predicted trajectory T and does not necessarily perform the vehicle speed limitation when an object does not exist on the predicted trajectory T. When the main controller 31 performs the automatic deceleration control, the main controller 31 may lower the vehicle-speed upper-limit value when an object exists on the predicted trajectory T as compared to when an object exists outside the predicted trajectory T. In this case, the obstacle detection device 55 does not necessarily perform the determination of whether the object is a person.

The travel stop control simply needs to cause the state of the main controller 31 to transition between at least two states of the normal control state S10 and the travel limitation state S12. In this case, the main controller 31 transitions to the travel limitation state S12 when the travel limitation condition is satisfied, and the main controller 31 transitions to the normal control state S10 when the travel limitation removal condition is satisfied. That is, the main controller 31 simply needs to set the vehicle-speed upper-limit value to 0 when a person exists on the predicted trajectory T.

The vehicle speed limitation control simply needs to cause the state of the main controller 31 to transition between at least two states of the limitation removal state S21 and the limitation start state S23. In this case, the main controller 31 transitions to the limitation start state S23 when the first limitation start condition is satisfied, and the main controller 31 transitions to the limitation removal state S21 when the limitation-start removal condition is satisfied. That is, the main controller 31 simply needs to set the vehicle-speed upper-limit value when an object exists in the vehicle speed limitation area.

The main controller 31 simply needs to set at least the vehicle-speed upper-limit value, and does not necessarily set the acceleration-rate upper-limit value.

The automatic deceleration area AA2 may be an area narrower than the detectable area in which the object detector 51 can detect an object.

The warning in the pre-travel-limitation state S11 and the pre-limitation-start state S22 may also be given at the time of the switchback of the forklift 10.

In the travel limitation state S12, a warning by the warning device 58 is not necessarily given.

The warning device 58 does not necessarily give a warning in the travel stop control, the vehicle speed limitation control for a person, and the vehicle speed limitation control for an obstacle. In this case, the forklift 10 does not necessarily include the warning device 58.

The object detector 51 may detect the position of an object existing in the forward movement direction, which is one of the directions of movement of the vehicle body 11. In this case, the stereo camera 52 is disposed so as to face forward with respect to the forklift 10. When the object detector 51 detects the position of an object existing in the forward movement direction of the forklift 10, the automatic deceleration area AA2 is an area that spreads forward of the forklift 10. When the forklift 10 is moving forward, the travel stop control, the vehicle speed limitation control for a person, and the vehicle speed limitation control for an obstacle function. Specifically, in each control of the travel stop control, the vehicle speed limitation control for a person, and the vehicle speed limitation control for an obstacle, the vehicle speed limitation is imposed according to the position of the object when the forklift 10 is moving forward by reversing "back" and "front" described in the embodiment. When the object detector 51 detects the position of an object existing in the forward movement direction, which is one of the directions of movement of the vehicle body 11, the main controller 31 derives the predicted trajectory T extending in the forward movement direction.

The object detector 51 may detect the position of an object existing in either the backward movement direction or the forward movement direction, which is one of the directions of movement of the vehicle body 11. In this case, the object existing in either the backward movement direction or the forward movement direction, which is one of the directions of movement of the vehicle body 11, may be detected by a single object detector 51, or may be detected by two object detectors 51 respectively for the forward movement direction and for the backward movement direction. When the forklift 10 is moving forward, the vehicle speed limitation is imposed according to the position of an object existing in the forward movement direction. When the forklift 10 is moving backward, the vehicle speed limitation is imposed according to the position of an object existing in the backward movement direction. That is, the main controller 31 sets a vehicle-speed upper-limit value when the traveling direction of the vehicle body 11 is a direction toward the object detected by the object detector 51.

The object detector 51 may use a Time of Flight (ToF) camera, laser imaging detection and ranging (LIDAR), a millimeter-wave radar, and the like instead of the stereo camera 52. The ToF camera includes a camera, and a light source for illumination of light, and derives a distance in the depth direction for each pixel of an image picked up by the camera from the time for the reflected light, emitted from the light source, return to the receiver. The LIDAR is a range finder that recognizes the surrounding environment by illumination with a laser from various angles and by receiving the light reflected from a part hit by the laser light. The millimeter-wave radar recognizes the surrounding environment by illuminating the surroundings with radio waves in a designated frequency band. The stereo camera 52, the ToF camera, the LIDAR, and the millimeter-wave radar are sensors that measure three-dimensional coordinates in the world coordinate system. The object detector 51 is preferred to include a sensor that measures three-dimensional coordinates. When the object detector 51 includes a sensor that measures three-dimensional coordinates, the obstacle detection device 55 determines whether the object is a person or an obstacle by using a person determiner that has learned through machine learning in advance. The object detector 51 may include a unit in which a plurality of sensors, such as the stereo camera 52 and the LIDAR, are combined together.

The object detector 51 may include a sensor that measures the coordinates of an object on an X-Y plane that is a coordinate plane expressing a horizontal plane instead of the stereo camera 52. That is, a sensor that measures two-dimensional coordinates of an object may be used as the sensor. As this kind of sensor, for example, two-dimensional LIDAR that performs laser illumination from various angles in the horizontal direction may be used.

The stereo camera 52 may include three or more cameras.

The warning device 58 may be included by a unit other than the object detector 51.

The warning device 58 may be directly activated by the main controller 31.

The forklift 10 may be a three-wheel forklift 10. In this case, the main controller 31 derives the predicted trajectory T from an expression and a map used for derivation of the predicted trajectory T of the three-wheel forklift 10. That is, the expression and the map used for derivation of the predicted trajectory T are changed depending on the type of the engine-type industrial vehicle.

The forklift 10 may allow shifting between automatic operation and manual operation.

The forklift 10 may be remotely operated by an operator who is not on the forklift 10.

The predicted trajectory calculator and the vehicle-speed upper-limit setter may be apparatuses different from the main controller 31. In this case, the main controller 31 may be connected to the predicted trajectory calculator and the vehicle-speed upper-limit setter by the bus 40 so that the main controller 31, the predicted trajectory calculator, and the vehicle-speed upper-limit setter exchange information between them.

The main controller 31 simply needs to perform at least one of the travel stop control or the vehicle speed limitation control for an obstacle.

The main controller 31 and the travel controller 83 may be the same controller.

The main controller 31, the travel controller 83, and the object detector 51 may exchange information between them by a wireless transceiver.

The engine-type industrial vehicle simply needs to be a vehicle used in operation in a limited region, such as a tractor used in transportation of a load or an order picker used in picking operation. That is, the engine-type industrial vehicle may be a vehicle that does not include the load handling apparatus 20 for performing loading and unloading.

What is claimed is:

1. An engine-type industrial vehicle, comprising:
   a vehicle body;
   an engine;
   a power transmission comprising a torque converter, a transmission, and one or more valves and configured to transmit a driving force of the engine to a driving wheel;
   one or more processors configured to adjust the driving force to be transmitted to the driving wheel; and
   a sensor configured to detect a position of an object that exists in a traveling direction of the vehicle body, wherein
   the one or more processors are configured to:
   derive a predicted trajectory that is a trajectory derived from a steering angle of a steered wheel and predicted to be followed by the vehicle body, the predicted trajectory being a region between a left edge corresponding to a left end of the vehicle body and a right edge corresponding to a right end of the vehicle body,
   impose a vehicle speed limitation on the vehicle body by setting a vehicle-speed upper-limit value when the object detected by the sensor is positioned in the predicted trajectory and the traveling direction of the vehicle body is a direction toward the object, and
   prevent a vehicle speed of the vehicle body from exceeding the vehicle-speed upper-limit value by performing a control so that the driving force to the driving wheel is cut off,
   wherein the sensor is configured to perform detection within a detection range, the detection range being an entire area in which the sensor can detect objects,
   wherein when the vehicle turns toward a right direction, the one or more processors are configured to extend the right edge of the predicted trajectory in the right direction to align with a rightmost edge of the detection region so as to increase a width and an area of the predicted trajectory and cover an entirety of the detection region extending in the right direction,
   wherein when the vehicle turns toward a left direction, the one or more processors are configured to extend the left edge of the predicted trajectory in the left direction to align with a leftmost edge of the detection region so as to increase the width and the area of the predicted trajectory and cover the entirety of the detection region extending in the left direction.

2. The engine-type industrial vehicle according to claim 1, wherein
   the engine-type industrial vehicle includes a brake mechanism, and
   the one or more processors are configured to prevent the vehicle speed of the vehicle body from exceeding the vehicle-speed upper-limit value by controlling the brake mechanism.

3. The engine-type industrial vehicle according to claim 1, wherein the one or more processors are configured to perform both of the control so that the braking force acts in the direction in which the movement of the vehicle body is prevented and the control so that the driving force to the driving wheel is cut off.

4. An engine-type industrial vehicle, comprising:
   a vehicle body;
   an engine;
   a power transmission comprising a torque converter, a transmission, and one or more valves and configured to transmit a driving force of the engine to a driving wheel;
   one or more processors configured to adjust the driving force to be transmitted to the driving wheel; and
   a sensor configured to detect a position of an object that exists in a traveling direction of the vehicle body, wherein
   the one or more processors are configured to:
   derive a predicted trajectory that is a trajectory derived from a steering angle of a steered wheel and predicted to be followed by the vehicle body, the predicted trajectory being a region between a left edge corresponding to a left end of the vehicle body and a right edge corresponding to a right end of the vehicle body,
   impose a vehicle speed limitation on the vehicle body by setting a vehicle-speed upper-limit value when the object detected by the sensor is positioned in the predicted trajectory and the traveling direction of the vehicle body is a direction toward the object, and
   prevent a vehicle speed of the vehicle body from exceeding the vehicle-speed upper-limit value by performing a control so that a braking force acts in a direction in which movement of the vehicle body is prevented, wherein the sensor is configured to perform detection within a detection range, the detection range being an entire area in which the sensor can detect objects, wherein when the vehicle turns toward a right direction, the one or more processors are configured to extend the right edge of the predicted trajectory in the right direction to align with a rightmost edge of the detection range so as to increase a width and an area of the predicted trajectory and cover an entirety of the detection region extending in the right direction, and wherein when the vehicle turns toward a left direction, the one or more processors are configured to extend the left edge of the predicted trajectory in the left direction to align with a leftmost edge of the detection range so as to increase the width and the area of the predicted trajectory and cover the entirety of the detection region extending in the left direction.

* * * * *